United States Patent [19]

Narayana et al.

[11] Patent Number: 5,661,418
[45] Date of Patent: Aug. 26, 1997

[54] SIGNAL GENERATION DECODER CIRCUIT AND METHOD

[75] Inventors: Pidugu L. Narayana; Andrew L. Hawkins, both of Starkville, Miss.

[73] Assignee: Cypress Semiconductor Corp., San Jose, Calif.

[21] Appl. No.: 615,718

[22] Filed: Mar. 13, 1996

[51] Int. Cl.[6] .................................................. H03K 19/00
[52] U.S. Cl. .............................. 326/105; 326/93; 365/221
[58] Field of Search .............................. 326/93, 104, 105; 365/189.01, 221

[56] References Cited

U.S. PATENT DOCUMENTS

| | | | |
|---|---|---|---|
| 4,802,122 | 1/1989 | Auvinen et al. | 365/154 |
| 4,839,866 | 6/1989 | Ward et al. | 365/221 |
| 4,875,196 | 10/1989 | Spaderna et al. | 365/238 |
| 4,891,788 | 1/1990 | Kreifels | 365/49 |
| 4,985,867 | 1/1991 | Ishii et al. | 365/221 |
| 5,084,837 | 1/1992 | Matsumoto et al. | 395/250 |
| 5,088,061 | 2/1992 | Golnabi et al. | 365/189.01 |
| 5,220,529 | 6/1993 | Kohiyama et al. | 365/189.01 |
| 5,228,002 | 7/1993 | Huang | 365/221 |
| 5,262,996 | 11/1993 | Shiue | 362/221 |
| 5,305,253 | 4/1994 | Ward | 365/73 |
| 5,311,475 | 5/1994 | Huang | 365/221 |
| 5,317,756 | 5/1994 | Komatsu et al. | 395/800 |
| 5,367,486 | 11/1994 | Mori et al. | 365/189.05 |
| 5,375,092 | 12/1994 | Taniguchi et al. | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,426,612 | 6/1995 | Ichige et al. | 365/220 |
| 5,467,319 | 11/1995 | Nusinov et al. | 365/231 |
| 5,490,257 | 2/1996 | Hoberman et al. | 395/427 |
| 5,506,809 | 4/1996 | Csoppenszky et al. | 365/221 |
| 5,513,318 | 4/1996 | van de Goor et al. | 395/185.01 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |

FOREIGN PATENT DOCUMENTS

| | | |
|---|---|---|
| 0113996 | 8/1989 | Japan. |
| 0676559 | 6/1994 | Japan. |

*Primary Examiner*—David R. Hudspeth
*Attorney, Agent, or Firm*—Bliss McGlynn, P.C.

[57] ABSTRACT

The present invention provides a circuit and method for manipulating the least significant bit (LSB) of the read and write count signal to generate a glitch free mutually non-exclusive decoder output. The present invention can be used to generate a logic to eliminate glitches in the inputs to a full/empty flag generator, an almost full/almost empty flag generator or a half-full/half-empty flag generator. The circuit can be extended to generate the logic to eliminate glitches in either direction as the count signals move across a boundary change in a half-full flag generation circuit.

24 Claims, 2 Drawing Sheets

SIGNAL GENERATION DECODER CIRCUIT AND METHOD

FIELD OF THE INVENTION

The invention relates to FIFO buffers generally and, more particularly, to a signal generation decoder for generating inputs to be used with a state machine or other device that generates status flags.

BACKGROUND OF THE INVENTION

A first-in first-out (FIFO) buffer uses counters, adders and combinatorial logic to generate a half empty and/or a half full flag. FIFOs can also generate programmable empty and programmable full flags having a user programmed offset ahead of the respective boundary flags. The programmable empty and programmable full flags are generated by computing the difference between the write and read counters and comparing this magnitude with the user programmed offset. The read and write counters are reset to zero upon master reset.

A copending application, Ser. No. 08/572,623, provides a state machine design which can be used to realize extremely short delays in generating half-full and half-empty flags and is hereby incorporated by reference in its entirety. The copending application generates a set of next state variables from a combination of three previous state variables and three additional inputs representing a logical OR of a read half-full and write half-full flag, an external write clock input and an external read clock input.

The inputs to the state machine (used to generate the status flags) are derived using an internal half-full decode logic having variations of the read and write clocks as inputs. The output of the decoder that is fed to the state machine inputs may have glitches. Glitches are generally defined as a transient state where a signal, in this case the output of the decoder, fluctuates between digital states (i.e., a digital one and a digital zero). The width (i.e., the length of time in the transient state) of the glitches is a function of the current read and write counter values. The state machine can be designed to handle these glitches internally at the expense of having an increased complexity.

Previous approaches to minimize the width of a glitch produced by a decoder circuit generally include sizing down the NMOS devices in the NOR gates as well as the PMOS devices in the NAND gates and adding a delay to allow the circuit to settle into a glitch-free steady state value. Essentially, the NOR and NAND gates delay producing an output until the glitch has passed. The disadvantage of such an approach is that the delay which is necessary to improve the function (by reducing glitches) slows down the circuit.

Other methods to reduce glitches are to employ edge preferential delays to use, to use non-overlapping clock generators or to add magnitude comparators. However, each of these methods slows down the overall performance of the underlying flag generation circuit.

SUMMARY OF THE INVENTION

The present invention provides a circuit for manipulating the least significant bit (LSB) of a read and write count signal to generate a glitch free mutually non-exclusive decoder output. The present invention can be used to generate logic to eliminate glitches in the signals presented to a full/empty flag generator, an almost full/almost empty flag generator or a half-full/half-empty flag generator. The circuit can be extended to generate the logic to eliminate glitches in either direction as the count signals move across a boundary change in a half-full flag generation circuit.

The objects, features and advantages of the present invention include providing a decoder circuit for presenting a glitch free, mutually non-exclusive output to be used by a flag generator that eliminates glitches in either direction across a boundary in a half-full flag generation system. The decoder circuit does not introduce significant additional delays while waiting for the circuit to stabilize. Additionally, the decoder advantageously eliminates glitches completely without affecting the timing of the circuit. The decoder circuit does not require simulations and does not impose a chip real estate penalty.

BRIEF DESCRIPTION OF THE DRAWINGS

These and other objects, features and advantages of the present invention will be apparent from the following detailed description and the appended claims in which:

DETAILED DESCRIPTION OF THE PREFERRED EMBODIMENTS

Figure 1:
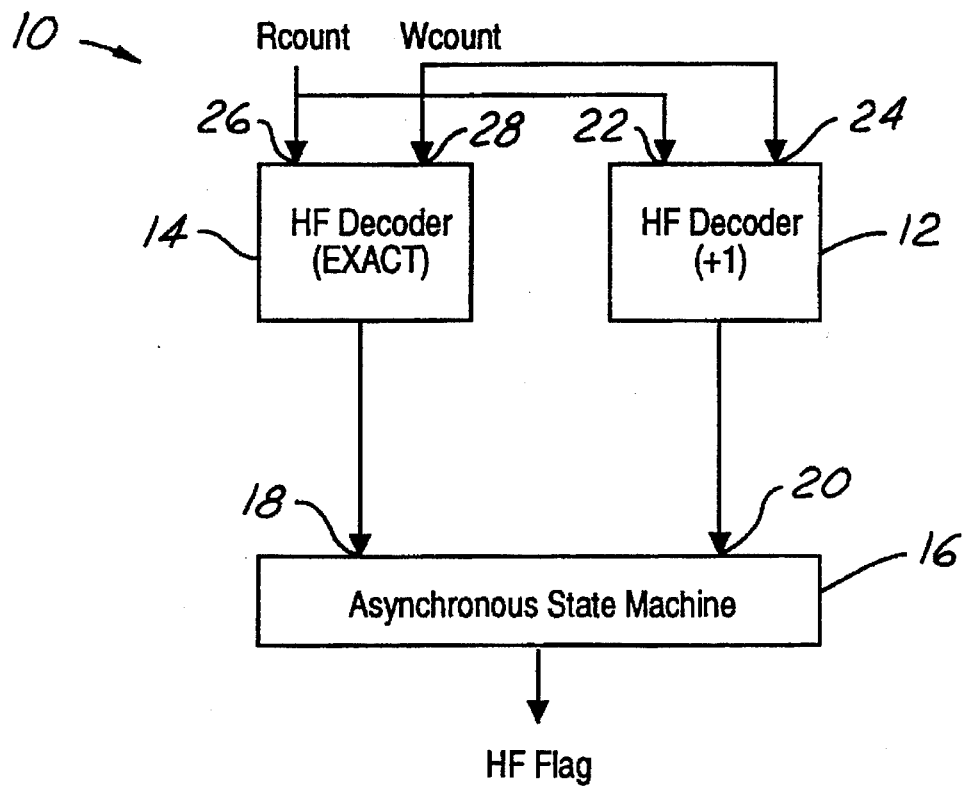
FIG. 1 is a block diagram of a preferred embodiment of the present invention shown creating the inputs for a half-full flag generating asynchronous state machine.

Referring to FIG. 1, a block diagram illustrating a circuit 10 is shown in accordance with a preferred embodiment of the present invention. The circuit 10 generally comprises a half-full decoder 12, a half-full decoder 14 and an asynchronous state machine 16. The state machine 16 receives a first input 18 and a second input 20. The state machine 16 is shown in accordance with the copending incorporated application referenced above. The half-full decoder 12 has a first input 22 that receives a read count signal Rcount and a second input 24 that receives a write count Wcount. Similarly, the half-full decoder 14 has a first input 26 that receives the read count signal Rcount and a second input 28 that receives the write count signal Wcount.

The half-full decoder 12 is a +1 decoder since it receives the +1 sub-count signal from the read count signal Rcount and the write exact sub-count signal from the write count signal Wcount. Specifically, the read count signal Rcount and the write count signal Wcount are both synchronous count signals that have four built-in sub-count signals (to be described in greater detail with respect to FIG. 2). The half-full decoder 14 is an exact decoder since it receives exact sub-count signals from the read count signal Rcount and the write count signal Wcount.

Figure 2:
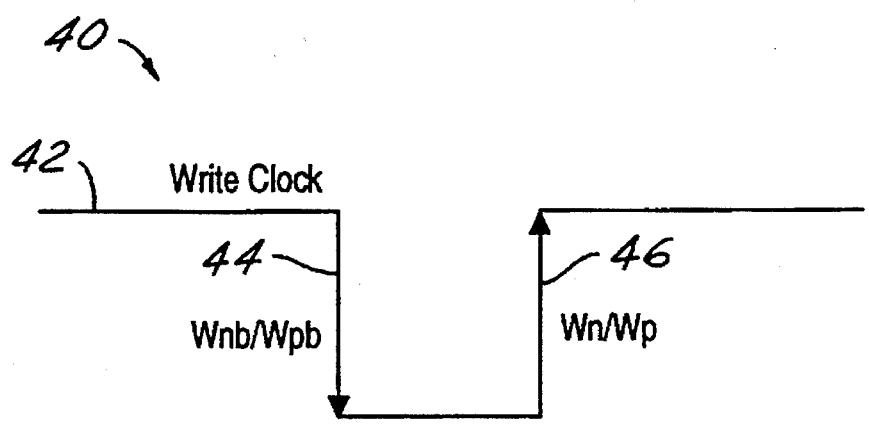
FIG. 2 is a timing diagram illustrating the four sub-count signals derived from each of the read and write synchronous signals.

Referring to FIG. 2, a write count signal 40 is shown graphically illustrating the four individual sub-count signals. The write count signal 40 generally comprises a write clock signal 42 that has a failing edge 44 and a rising edge 46. A signal Wnb and a signal Wpb are triggered by the falling edge 44. A signal Wn and a signal Wp are triggered by the rising edge 46. The signal Wn and the signal Wnb are the +1 sub-count signals and the signal Wp and the signal Wpb are the exact sub-count signals. As a result, four individual sub-count signals Wnb, Wpb, Wn and Wp are created that each having specific functional characteristics needed in circuit design, specifically with regards to FIG. 3. The read count signal Rcount has four similar built-in sub-count signals.

Figure 3:
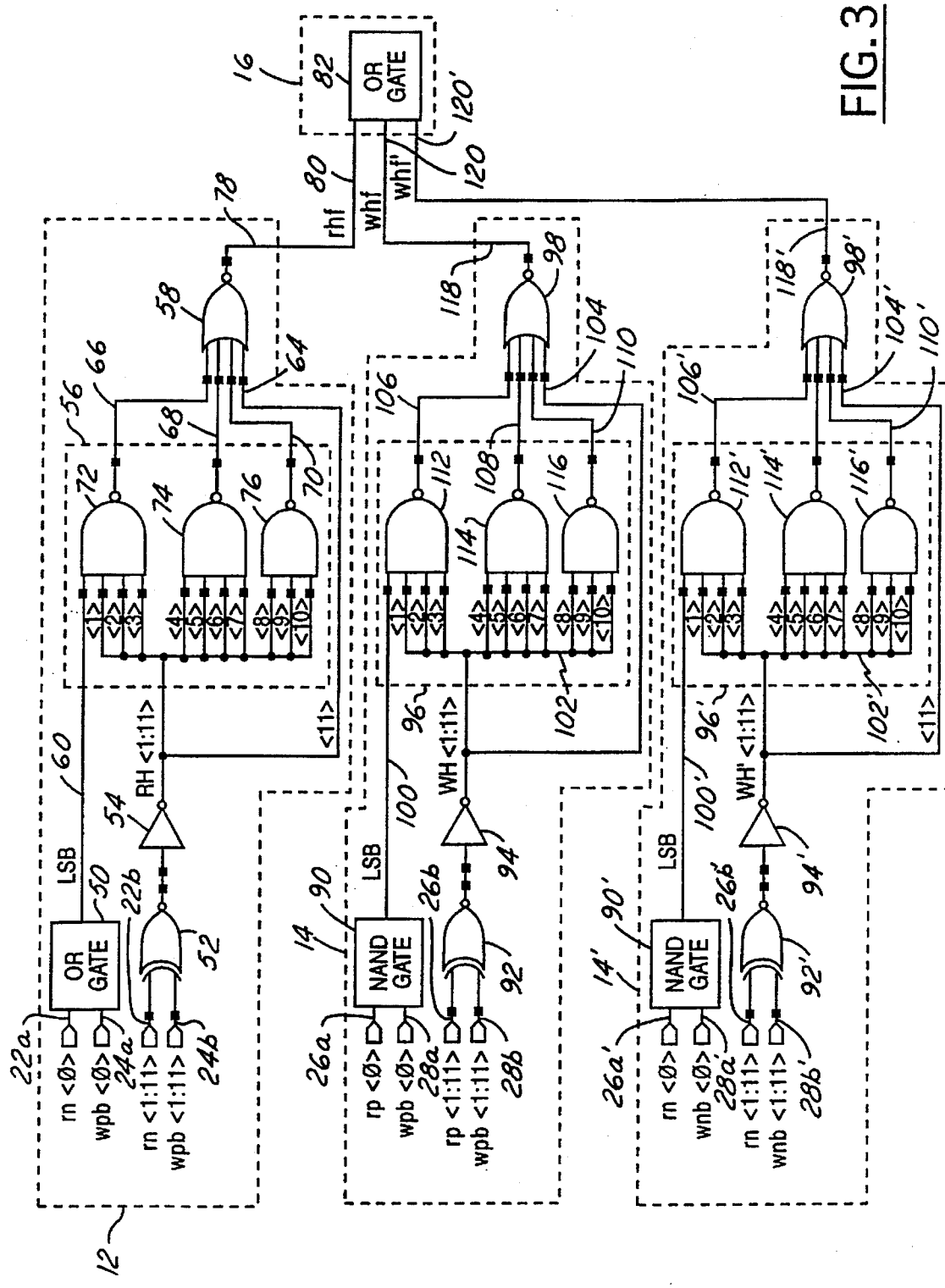
FIG. 3 is a circuit diagram of a preferred embodiment of the present invention.

Referring to FIG. 3, a circuit diagram of the half-full decoder 12, the half-full decoder 14 and the half-full decoder 14' is shown. FIG. 3 is an example of the present invention tailored to produce inputs for a half-full/half-empty flag generating state machine. Inputs for a full/empty or almost full/almost empty flag generating state machine can be generated as well. The half-full decoder 12 generally comprises an OR gate 50, an exclusive NOR (XNOR) gate 52, an inverter 54, a NAND section 56 and a NOR gate 58. The OR gate 50 receives a signal from an input 22a that receives the read +1 sub-count signal Rn and a signal from an input 24a that receives the write exact sub-count signal Wpb. The OR gate 50 presents a signal to a LSB (Least Significant Bit) input 60 of the NAND section 56. The signal present at the input 22a represents a LSB of the read +1 sub-count signal Rn. The signal at the input 24a represents a LSB of the write exact sub-count signal Wpb. The OR gate 50 presents a signal that is at a digital high state (for a positive polarity logic) when either the input 22a or the input 24a is high.

The XNOR gate 52 receives a signal from the input 22b and a signal from the input 24b. The input 22b is a multi-bit input representing 11 bits of the read +1 sub-count signal Rn. The input 24 is a multi-bit input that receives 11 bits from the write exact sub-count signal Wpb. The XNOR gate 52 and the inverter 54 work in combination to produce the effect of a XOR gate having an output that is presented to an input 62 of the NAND section 56 as well as to an input 64 of the NOR gate 58. The NAND section 56 presents an output 66, an output 68 and an output 70 that are each received by the NOR gate 58.

The NAND section 56 comprises a NAND gate 72, a NAND gate 74 and a NAND gate 76. The NAND gate 72 receives a signal from the LSB input 60 as well as signals representing the first, second and third bits of the signal received at a multi-bit input 62. The NAND gate 74 receives the fourth, fifth, sixth and seventh bits of the signal received at the multi-bit input 62. The NAND gate 76 receives the eight, ninth and tenth bits of the signal received at the multi-bit input 62. The NAND section, in combination with the OR gate 50, the XOR gate 52, the inverter 54 and the NOR gate 58, provides a signal presented to an output 78 that represents a read half-full signal RHF. The signal RHF is presented to an input 80 of an OR gate 82. The input 80 generally corresponds to the input 20 of FIG. 1.

The half-full decoder 14 generally comprises a NAND gate 90, a XNOR gate 92, an inverter 94, a NAND section 96 and a NOR gate 93. The OR gate 90 receives a signal from an input 26a that receives the read exact sub-count signal Rp and a signal from an input 28a that receives the write exact sub-count signal Wpb. The OR gate 90 presents a signal to a LSB input 100 of the NAND section 96. The signal present at the input 26a represents the least significant bit of the read exact sub-count signal Rp. The signal at the input 28a represents the least significant bit of the write exact sub-count signal Wpb. The OR gate 90 presents a signal that is at a digital high state when either the input 26a or the input 28a is high.

The XNOR gate 92 receives a signal from the input 26b and a signal from the input 28b. The input 26b is a multi-bit input representing 11 bits of the read exact sub-count signal Rp. The input 28b is a multi-bit input that receives 11 bits from the write exact sub-count signal Wpb. The XNOR gate 92 and the inverter 94 work in combination to produce the effect of a XOR gate having an output that is presented to an input 102 of the NAND section 96 as well as to an input 104 of the NOR gate 98. The NAND section 96 presents an output 106, an output 108 and an output 110 that are each received by the NOR gate 98.

The NAND section 96 comprises a NAND gate 112, a NAND gate 114 and a NAND gate 116. The NAND gate 112 receives a signal from the LSB input 100 as well as signals representing the first, second and third bits of the signal received at a multi-bit input 102. The NAND gate 114 receives the fourth, fifth, sixth and seventh bits of the signal received at the multi-bit input 102. The NAND gate 116 receives the eighth, ninth and tenth bits of the signal received at the multi-bit input 102. The NAND section, in combination with the OR gate 90, the XOR gate 92, the inverter 94 and the NOR gate 98, provide a signal presented to an output 118 that represents a write half-full signal WHF. The signal WHF is presented to an input 120 of the OR gate 82. The input 120 generally corresponds to the input 18 of FIG. 1.

The half-full decoder 14' generally comprises similar logic components as the half-full decoder 14. The individual components of the half-full decoder 14' are indicated by using primed reference numerals that correspond to the reference numerals used in the description of the half-full decoder 14. The XNOR gate 92' receives a signal from the input 26b' and a signal from the input 28b'. The input 26b' is a multi-bit input representing 11 bits of the read +1 sub-count signal Rn. The input 28b' is a multi-bit input that receives 11 bits from the write +1 sub-count signal Wnb. The half-full decoder 14' provides a signal to the output 118' which represents a write half-full signal WHF'. The signal WHF' is presented to an input 120' of the OR gate 82.

The half-full decoder 14 in combination with the half-full decoder 12 produce a filtering effect of the signal WHF and the signal WHF that are each presented to the state machine 16. The OR gate 82 is a device internal to the state machine 16 that receives the signal WHF and the signal RHF. As a result, glitches are filtered out in a positive direction (i.e., from a less than half-full state to a more than half-full state). To filter out glitches in a negative direction (i.e., from a more than half-full state to a less than half-full state), the half-full decoder 14' is generally required. The half-full decoder 14' provides the write half-full signal WHF' that functions in combination with the signal WHF and the signal RHF to eliminate glitches in the negative direction across the boundary. If any of the signals WHF, WHF' or RHF are at a digital high state, the output of the OR gate 82 will be a digital high.

If glitches are only required to be eliminated in the positive direction, the implementation of the half-full decoder 12 and the half-full decoder 14 will generally be required. If glitches are required to be eliminated in both the positive and the negative directions across the half-full boundary, the implementation of the half-full decoder 12, the half-full decoder 14 and the half-full decoder 14' will generally be required.

TABLE 1 illustrates a graphical representation of the write half-full signal WHF, the write half-full signal WHF' and the read half-full signal RHF as compared to the write-pointer and the read-pointer during a transition in a positive direction.

TABLE 1

| | write-pointer | read-pointer | RHF | WHF | WHF[1] | OR |
|---|---|---|---|---|---|---|
| 1 | 0 | 0 | 0 | 0 | 0 | 0 |
| 2 | 1 | 0 | 0 | 0 | 0 | 0 |
| 3 | 2 | 0 | 1↓ | 1↓ | 1 | 1 |
| 4 | 3 | 0 | 1↓ | 1↓ | 0 | 1 |
| 5 | 4 | 0 | 0 | 0 | 0 | 0 |
| 6 | 1 | 1 | 0 | 0 | 0 | 0 |

TABLE 1-continued

| write-pointer | read-pointer | RHF | WHF | WHF¹ | OR |
|---|---|---|---|---|---|
| 7 | 2 | 1 | 0 | 0 | 0 |
| 8 | 3 | 1 | 0 | 1 | 1↓ | 1 |
| 9 | 4 | 1 | 1 | 0 | 1↓ | 1 |
| 10 | 5 | 1 | 0 | 0 | 0 |
| 11 | 2 | 2 | 0 | 0 | 0 |
| 12 | 3 | 2 | 0 | 0 | 0 |
| 13 | 4 | 2 | 1↓ | 1↓ | 1 | 1 |
| 14 | 5 | 2 | 1↓ | 1↓ | 0 | 1 |
| 15 | 6 | 2 | 0 | 0 | 0 | 0 |
| 16 | 3 | 3 | 0 | 0 | 0 | 0 |
| 17 | 4 | 3 | 0 | 0 | 0 | 0 |
| 18 | 5 | 3 | 0 | 1 | 1↓ | 1 |
| 19 | 6 | 3 | 1 | 0 | 1↓ | 1 |
| 20 | 7 | 3 | 0 | 0 | 0 | 0 |
| 21 | 4 | 4 | 0 | 0 | 0 | 0 |
| 22 | 5 | 4 | 0 | 0 | 0 | 0 |
| 23 | 6 | 4 | 1↓ | 1↓ | 1 | 1 |
| 24 | 7 | 4 | 1↓ | 1↓ | 0 | 1 |
| 25 | 0 | 4 | 0 | 0 | 0 | 0 |
| 26 | 5 | 5 | 0 | 0 | 0 | 0 |
| 27 | 6 | 5 | 0 | 0 | 0 | 0 |
| 28 | 7 | 5 | 0 | 1 | 1↓ | 1 |
| 29 | 0 | 5 | 1 | 0 | 1↓ | 1 |
| 30 | 1 | 5 | 0 | 0 | 0 | 0 |
| 31 | 6 | 6 | 0 | 0 | 0 | 0 |
| 32 | 7 | 6 | 0 | 0 | 0 | 0 |
| 33 | 0 | 6 | 1↓ | 1↓ | 1 | 1 |
| 34 | 1 | 6 | 1↓ | 1↓ | 0 | 1 |
| 35 | 2 | 6 | 0 | 0 | 0 | 0 |
| 36 | 7 | 7 | 0 | 0 | 0 | 0 |
| 37 | 0 | 7 | 0 | 0 | 0 | 0 |
| 38 | 1 | 7 | 0 | 1 | 1↓ | 1 |
| 39 | 2 | 7 | 1 | 0 | 1↓ | 1 |
| 40 | 3 | 7 | 0 | 0 | 0 | 0 |

When the write-pointer switches between 3 and 4 (indicated by the column numbers 8 and 9) while the read-pointer remains at 1, the read half-full signal RHF switches from 0 to 1 while the write half-full signal WHF switches from 1 to 0. The opposite transition of the read half-full signal RHF and the write half-full signal WHF may create a potential glitch. As a result, the write half-full signal WHF' remains 1 which forces the output of the OR gate 82 to remain a 1.

TABLE 2 illustrates a graphical representation of the write half-full signal WHF, the write half-full signal WHF' and the read half-full signal RHF as compared to the write-pointer and the read-pointer during a transition in a negative direction.

TABLE 2

| write-pointer | read-pointer | RHF | WHF | WHF¹ | OR |
|---|---|---|---|---|---|
| 1 | 0 | 0 | 0 | 0 | 0 |
| 2 | 4 | 0 | 0 | 0 | 0 |
| 3 | 5 | 0 | 1↓ | 0 | 1↓ | 1 |
| 4 | 6 | 0 | 1↓ | 1 | 1↓ | 1 |
| 5 | 7 | 0 | 0 | 0 | 0 |
| 6 | 0 | 1 | 0 | 0 | 0 |
| 7 | 1 | 1 | 0 | 0 | 0 |
| 8 | 5 | 1 | 0 | 0 | 0 |
| 9 | 6 | 1 | 1 | 1↓ | 0 | 1 |
| 10 | 7 | 1 | 0 | 1↓ | 1 | 1 |
| 11 | 0 | 2 | 1↑ | 1 | 1 | 1 |
| 12 | 1 | 2 | 0↑ | 0 | 0 | 0 |
| 13 | 2 | 2 | 0↑ | 0 | 0 | 0 |
| 14 | 6 | 2 | 0↑ | 0 | 0 | 0 |
| 15 | 7 | 2 | 1↑ | 0 | 1 | 1 |
| 16 | 0 | 3 | 1 | 1↓ | 0 | 1 |
| 17 | 1 | 3 | 0 | 1↓ | 1 | 1 |

TABLE 2-continued

| write-pointer | read-pointer | RHF | WHF | WHF¹ | OR |
|---|---|---|---|---|---|
| 18 | 2 | 3 | 0 | 0 | 0 | 0 |
| 19 | 3 | 3 | 0 | 0 | 0 | 0 |
| 20 | 7 | 3 | 0 | 0 | 0 | 0 |
| 21 | 0 | 4 | 0 | 0 | 0 | 0 |
| 22 | 1 | 4 | 1↓ | 0 | 1↓ | 1 |
| 23 | 2 | 4 | 1↓ | 1 | 1↓ | 1 |
| 24 | 3 | 4 | 0 | 0 | 0 | 0 |
| 25 | 4 | 4 | 0 | 0 | 0 | 0 |
| 26 | 1 | 5 | 0 | 0 | 0 | 0 |
| 27 | 2 | 5 | 1 | 1↓ | 0 | 1 |
| 28 | 3 | 5 | 0 | 1↓ | 1 | 1 |
| 29 | 4 | 5 | 0 | 0 | 0 | 0 |
| 30 | 5 | 5 | 0 | 0 | 0 | 0 |
| 31 | 2 | 6 | 0 | 0 | 0 | 0 |
| 32 | 3 | 6 | 1↓ | 0 | 1↓ | 1 |
| 33 | 4 | 6 | 1↓ | 1 | 1↓ | 1 |
| 34 | 5 | 6 | 0 | 0 | 0 | 0 |
| 35 | 6 | 6 | 0 | 0 | 0 | 0 |
| 36 | 3 | 7 | 0 | 0 | 0 | 0 |
| 37 | 4 | 7 | 1 | 1↓ | 0 | 1 |
| 38 | 5 | 7 | 0 | 1↓ | 1 | 1 |
| 39 | 6 | 7 | 0 | 0 | 0 | 0 |
| 40 | 7 | 7 | 0 | 0 | 0 | 0 |

When the read-pointer switches between 7 and 0 (indicated by the column numbers 10 and 11) while the write-pointer remains at 1, the read half-full signal RHF switches from 0 to 1 while the write half-full signal WHF remains at 1. The transition desired may create a potential glitch. As a result, the write half-full signal WHF' remains 1 which forces the output of the OR gate 82 to remain a 1.

While the invention has been particularly shown and described with reference to the preferred embodiments thereof, it will be understood by those skilled in the art that various changes in form and details may be made without departing from the spirit and scope of the invention.

We claim:

1. A circuit for decoding read and write signals used in a memory system, said circuit comprising:

first decoder means having a first input for receiving a read counter and a second input for receiving a write counter, said first decoder means providing a first decoded clock signal; and second decoder means having a third input for receiving said read counter and a fourth input for receiving said write counter, said second decoder means providing a second decoded clock signal.

2. The circuit according to claim 1 wherein said first and second decoded clock signals are used to produce one or more status flags.

3. The circuit according to claim 2 wherein said one or more status flags indicate when certain predefined criteria are met.

4. The circuit according to claim 2 wherein said memory system is a FIFO buffer.

5. The circuit according to claim 1 wherein said first and second decoded clock signals are produced without generating glitches prior to settling into a steady state.

6. The circuit according to claim 1 wherein said first and second decoded clock signals are produced without generating any significant additional delays.

7. The circuit according to claim 1 wherein said first decoder means further comprises:

first logic means for receiving said read counter and said write counter as a multi-bit signal and providing a first processed signal, said first logic means does not receive a least significant bit (LSB) of said read and write counters;

second logic means for receiving said LSB of said read counter and said write counter, said second logic means providing a second processed signal; and first gate means receiving said first and second processed signals from said first and second logic means, said first gate means providing a single-bit signal representing said first decoded clock signal.

8. The circuit according to claim 7 wherein said second decoder means further comprises:

third logic means for receiving said read counter and said write counter as a multi-bit signal and providing a third processed signal, said first logic means does not receive a (LSB) of said read and write counters;

fourth logic means for receiving said LSB of said read counter and said write counter, said second logic means providing a fourth processed signal; and second gate means receiving said first and second processed signals from said first and second logic means, said second gate means providing a single-bit signal representing said first decoded clock signal.

9. The circuit according to claim 7 wherein said first gate moans comprises:

a plurality of NAND gates each producing an output and each receiving one or more of said bits of said first processed signal, one of said plurality of NAND gates receives said LSB signal; and third gate means for receiving each of said outputs from said plurality of NAND gates, said third gate means for producing said first decoded clock signal.

10. The circuit according to claim 8 wherein said second gate means comprises:

a plurality of NAND gates each producing an output and each receiving one or more of said bits of said fourth processed signal, one of said plurality of NAND gates receives said LSB signal; and fourth gate means for receiving each of said outputs from said plurality of NAND gates, said fourth gate means providing said second decoded clock signal.

11. The circuit according to claim 1 further comprising third decoder means having a fifth input for receiving said read counter and a sixth input for receiving said write counter, said third decoder means providing a third decoded clock signal.

12. The circuit according to claim 11 wherein said third decoder means further comprises:

fifth logic means for receiving said read counter and said write counter as a multi-bit signal and providing a fifth processed signal, said first logic means does not receive a least significant bit (LSB) of said read and write counters;

sixth logic means for receiving said LSB of said read counter and said write counter, said second logic means providing a sixth processed signal; and fifth gate means for receiving said first and second processed signals from said first and second logic means, said fifth gate means providing a single-bit signal representing said first decoded clock signal.

13. The circuit according to claim 12 wherein said fifth gate means comprises:

a plurality of NAND gates each producing an output and each receiving one or more of said bits of said first processing signal, one of said plurality of NAND gates receives said LSB signal; and sixth gate means for receiving each of said outputs from said plurality of NAND gates, said sixth gate means providing said third decoded clock signal.

14. A circuit for decoding read and write signals used in a memory system, said circuit comprising:

first decoder means having a first input for receiving a read counter and a second input for receiving a write counter, said first decoder means providing a first decoded clock signal;

second decoder means having a third input for receiving said read counter and a fourth input for receiving said write counter, said second decoder means providing a second decoded clock signal; and third decoder means having a fifth input for receiving said read counter and a sixth input for receiving said write counter, said third decoder means providing a third decoded clock signal.

15. The circuit in claim 14 wherein said first, second and third decoder means each further comprise:

first logic means for receiving said read counter and said write counter as a multi-bit signal and providing a first processed signal, said first logic means does not receive a least significant bit (LSB) of said read and write counters;

second logic means for receiving said LSB of said read counter and said write counter, said second logic means providing a second processed signal; and first gate means receiving said first and second processed signals from said first and second logic means, said first gate means providing a single-bit signal representing said first decoded clock signal.

16. The circuit according to claim 15 wherein each of said first gate means further comprises:

a plurality of NAND gates each producing an output and each receiving one or more of said bits of said first processing signal, one of said plurality of NAND gates receives said LSB signal; and third gate means for receiving each of said outputs from said plurality of NAND gates, said third gate means providing said first decoded clock signal.

17. The circuit according to claim 16 wherein said first and second decoded clock signals are used to produce one or more status flags.

18. The circuit according to claim 17 wherein said memory system is a FIFO buffer.

19. The circuit according to claim 16 wherein said first and second decoded clock signals are produced without generating glitches prior to settling into a steady state.

20. The circuit according to claim 17 wherein said first decoder means further comprises:

first logic means for receiving said read counter and said write counter as a multi-bit signal and providing a first processed signal, said first logic means does not receive a least significant bit (LSB) of said read and write counters;

second logic means for receiving said LSB of said read counter and said write counter, said second logic means providing a second processed signal; and first gate means receiving said first and second processed signals from said first and second logic means, said first gate means providing a single-bit signal representing said first decoded clock signal.

21. A method for decoding read and write signals used in a memory system comprising the steps of:

inputting a read counter and a write counter to a first decoder providing a first decoded clock signal;

inputting said read counter and said write counter to a second decoder providing a second decoded clock signal; and whereby said first and second decoded clock signals are used for producing one or more status flags.

22. The method according to claim 21 including the step of producing said one or more status flags when certain predefined criteria are met.

23. The method according to claim 21 including the step of producing said first and second decoded clock signals without generating glitches prior to settling into a steady state.

24. The method according to claim 21 including the step of producing said first and second decoded signals without generating any significant additional delays.

* * * * *